Nov. 20, 1923.
P. D. SACKETT
1,474,556
AUTOMATIC SHUT-OFF VALVE FOR FUEL TANKS
Filed Oct. 5, 1922
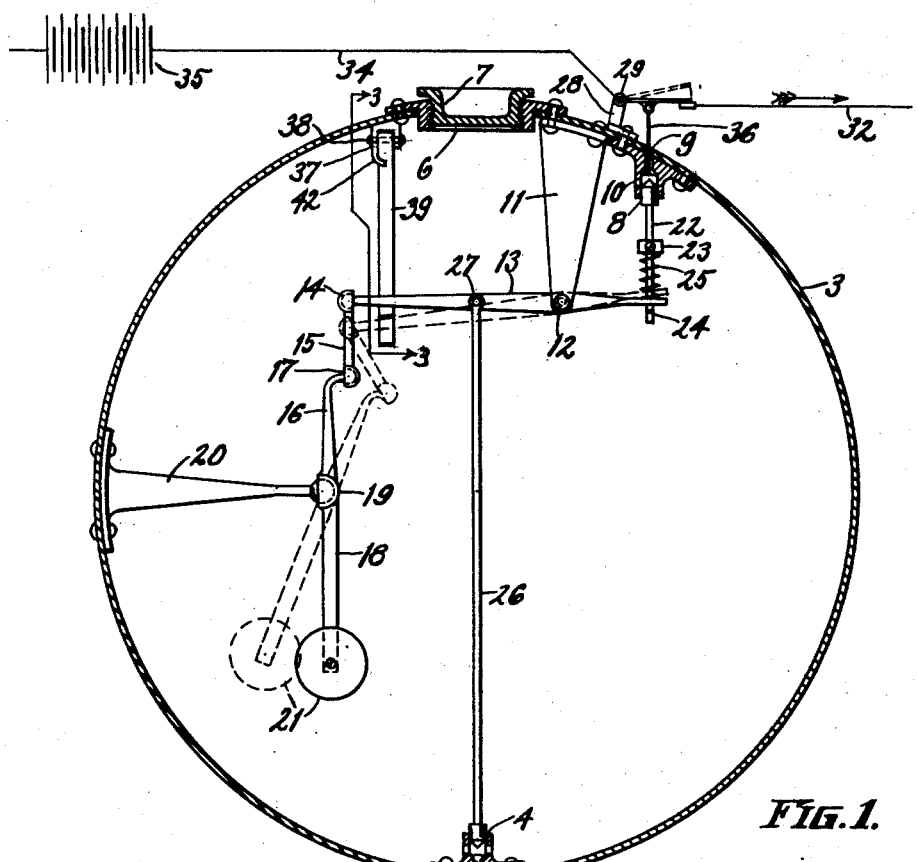
FIG.1.
FIG.3.
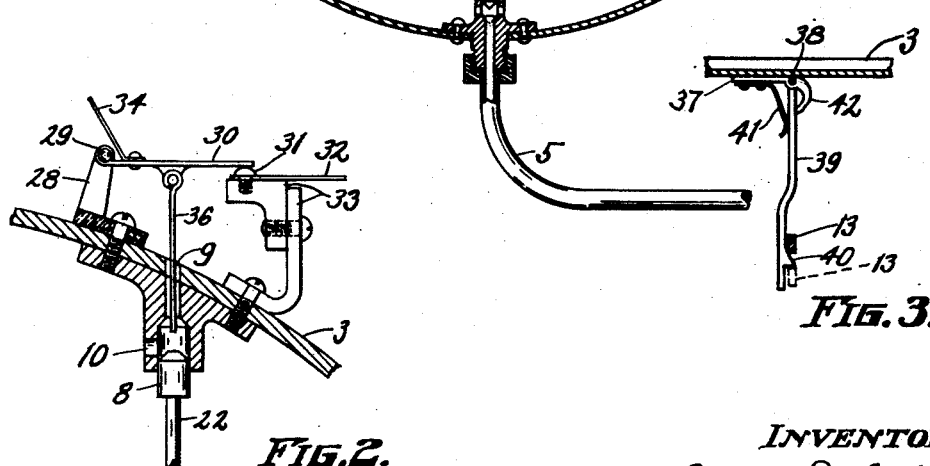
FIG.2.
INVENTOR:
Pomeroy D. Sackett
BY A. M. Carlsen.
ATTORNEY.

Patented Nov. 20, 1923.

1,474,556

UNITED STATES PATENT OFFICE.

POMEROY D. SACKETT, OF ST. PAUL, MINNESOTA.

AUTOMATIC SHUT-OFF VALVE FOR FUEL TANKS.

Application filed October 5, 1922. Serial No. 592,668.

*To all whom it may concern:*

Be it known that I, POMEROY D. SACKETT, a citizen of the United States, residing at St. Paul, in the county of Ramsey and State of Minnesota, have invented certain new and useful Improvements in Automatic Shut-Off Valves for Fuel Tanks, of which the following is a specification.

My invention relates to automatic safety devices particularly adapted for automobiles and the object is to provide a simple and efficient device by means of which the electric circuit and the flow of fuel to the engine of an automobile are automatically shut off when an automobile accidentally turns over or is tipped at an unusual angle for repairs or otherwise. The device is applicable also to motor boats, motor cycles, etc.

In the accompanying drawing;

Fig. 1 is a cross sectional elevation of the fuel tank of an explosive engine as in an automobile showing the improved device installed therein.

Fig. 2 is an enlargement of the upper right hand portion of Fig. 1 slightly modified and showing the main parts in and adjacent the fuel tank vent hole. Fig. 3 is a section on line 3—3 in Fig. 1.

Referring to the drawing by reference numerals, 3 designates a cylindrical fuel tank holding gasoline or other liquid fuel which is let out through a valve 4 and is lead by a pipe 5 to the carburetor of an explosive engine (not shown).

Said valve 4 is located in the lower portion of the tank, while in the upper portion is an intake opening 6 having a screw threaded closure 7. In said upper portion or top of the tank is a vent valve having a plug 8 for letting in air through passages 9 and 10 to prevent vacuum. Near said valve is fixed in the tank a bracket 11 in which is fulcrumed at 12 a horizontally disposed beam lever 13, the longer arm of which is connected by a ball and socket joint 14 to the upper member 15 of a toggle joint composed of said member 15 and a lower member 16 connected by a ball and socket joint 17. The member 16 is an arm of a pendulum lever 18 fulcrumed at 19 on a bracket 20 and having a weight 21.

The valve plug 8 has its stem 22 slidably retained in a hole in one arm of the beam lever 13 and provided with a collar 23 above and a pin 24 below the lever and a compressed coil spring 25 between the lever and the collar.

Another valve stem 26 is connected at 27 to the opposite arm of the lever 13.

Near the vent valve is fixed on the tank an external bracket 28, in which is pivoted at 29 (see Fig. 2) a swingable member 30 of an electric switch. Normally this member rests upon a contact screw 31, holding a circuit wire 32 upon a bracket 33 fixed on the tank, while the member 30 has a wire 34 connecting with an electric battery 35. The member 30 also has a small rod 36 depending loosely through aperture 9 in ready position to be pushed upward by the valve plug 8 and thus open the switch and break the circuit which normally carries a current over wires 34, 32 to the spark plugs (not shown).

In the operation it will thus be understood that if a serious leaning or turning over, or upsetting of the automobile takes place the weight 21 will swing so far out of its vertical position that the toggle joints (as shown in dotted lines in Fig. 1) will cause the lever 13 to close both the valves 4 and 8, and at the same time the closed valve 8 will push on rod 36 and break the electric circuit to the spark plugs and thus the engine will have to stop and remain so until it is restored to normal position. Leakage of fuel is also prevented even if the upsetting should be so serious as to break the tube 5.

The function of the spring 25 is to close the valve nearest to it first and then yield until the other valve is also closed, whereas without the spring it would be very difficult to make both valves close fully.

While the toggle joint, the weighed pendulum and beam lever make up a suitable mechanism for the closing of the valves I do not mean to confine my invention to said means, as it is obvious that other mechanisms will also answer the purpose and will come under the scope and spirit of my invention.

As best shown in Fig. 3 near the intake opening 6 is fixed a bracket 37, to which is pivoted at 38 a depending arm 39 having a lateral ratchet tooth 40 arranged to engage the beam lever 13 when the latter is in its lowest position with the valves closed. This is to prevent the engine from starting to run again if after an accident it happens that the auto gets standing on its wheels before the operator is ready for further driving. During normal riding the arm 39 is held by a light spring 41 against a rigid finger 42 of the bracket so as not to contact with the beam lever 13, but when the beam lever is forced downward by the toggle joint the spring 41 yields and allows the lever 13 to slip over the tooth 40 and engage below it. When the car is again ready for driving the operator puts a finger or any suitable tool down the aperture 6 and disengages the arm 29 from the beam lever 13, which is then caused by the pendulum lever to resume its normal position.

What I claim is:

1. The combination with a fuel tank having an outlet valve and a vent valve of a mechanism automatically closing said valves whenever the tank is tilted to a certain degree out of its normal position, and an electric circuit arranged to carry electric current to spark plugs in an engine receiving fuel from said tank, an electric switch in the circuit and operative connection between the valve closing mechanism and the switch, whereby the circuit is broken simultaneously with the closing of the valves.

2. The structure specified in claim 1, said mechanism being mounted within the tank and comprising a beam lever connected with the valve stems, a vertically disposed lever ball-jointed to a support and having a weight at its lower end, the upper end extending above the support and having a toggle joint connection with the beam lever, said toggle joint being foldable in any direction.

3. The structure specified in claim 1, in which the operative connection comprises a small rod suspended from the electric switch down into the opening in the vent valve and arranged to be pushed upward by the valve plug when it moves into the closed position.

4. The structure specified in claim 1, and means automatically engaging and holding said mechanism with the valves closed and the switch open until released by the operator.

In testimony whereof I affix my signature.

POMEROY D. SACKETT.